May 19, 1931.  F. W. KERKMAN  1,806,064

TIRE CHAIN

Filed Jan. 23 1928

Inventor
Freidreck W. Kerkman
By Herbert E. Smith
Attorney

Patented May 19, 1931

1,806,064

UNITED STATES PATENT OFFICE

FREIDRECK W. KERKMAN, OF ST. JOHN, WASHINGTON

TIRE CHAIN

Application filed January 23, 1928. Serial No. 248,778.

My present invention relates to improvements in tire chains for use on the tires of automotive vehicle wheels to prevent skidding. The primary object of the invention is the provision of tire chains having specially constructed tread plates which join the tread chains or cross chains that are supported between the side chains of the tire chain. The tread plates are designed so that they may with facility be utilized to join or connect the cross chains, and when the latter chains become worn or should the tread plate itself become worn, the tread plate may be disjointed and removed from the cross chains. In this manner, necessary repairs may be made with convenience and the tire chains may thus be maintained in mechanically correct working condition at all times.

The invention consists in certain novel combinations and arrangements of parts involving the cross chains and the tread plates as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention.

Figure 1:
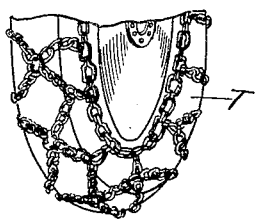
Figure 1 is a perspective view showing the lower portion of a wheel and tire with the tire chains of my invention applied thereto.
Figure 2:
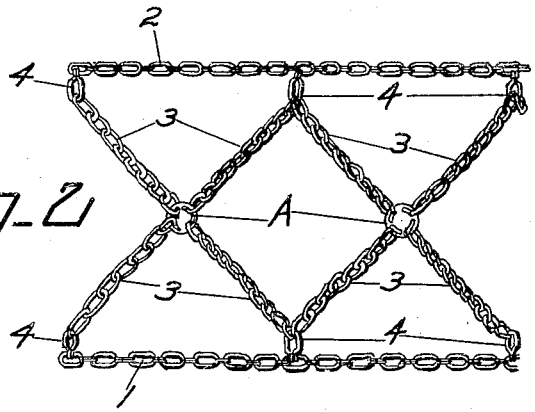
Fig. 2 is a plan view showing a portion of the tire chain flattened out.
Figure 3:
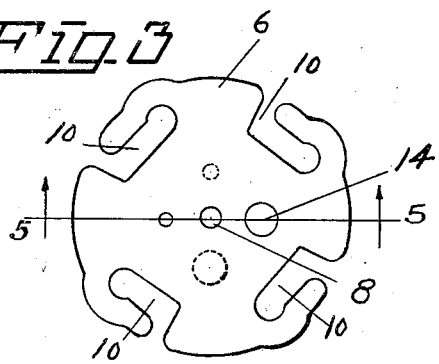
Fig. 3 is a plan view of one of the pair of plates used in the formation of a tread plate.
Figure 4:
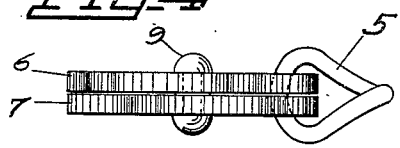
Fig. 4 is a plan view of a broken tread plate, one part of the tread plate being shown in locked position while the other part is shown in unlocked position.
Figure 5:
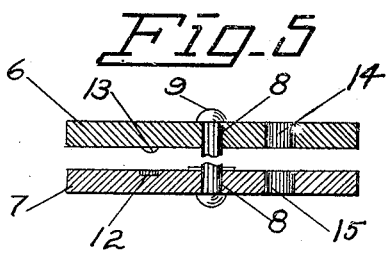
Fig. 5 is a sectional view of a tread plate as at line 5—5 of Fig. 3 showing the plates separated.
Figure 6:
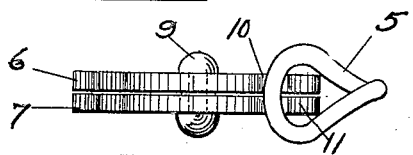
Fig. 6 is an edge view of a tread plate showing a link from a cross chain connected thereto.
Figure 7:
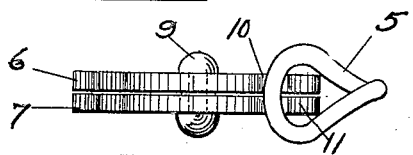
Fig. 7 is a view similar to Fig. 6 but showing the plates broken away and in section to show a cross link connecting the plates.

In order that the general arrangement and relation of parts may readily be understood, I have shown in Fig. 1 a portion of a tire T to which the tire chain is applied. This tire chain comprises the usual side chains 1 and 2 that extend around the tire and are fashioned with suitable locks or fasteners to join the ends of the respective side chains. The cross chains 3 provide a tread of diamond shape and they are connected to the respective side chains by end links 4. At the central portion of the tread of the tire, these cross chains have their end links 5 connected to the tread plates which are indicated as a whole by the letter A. Each tread plate comprises a pair of circular plates 6 and 7 and the end links 5 of the cross chains are utilized to hold these plates at the center of the tread of the tire. The complementary plates 6 and 7 have central holes 8 therein through which a rivet pin or bolt 9 extends and these plates are held in such manner that a relative movement of them is permitted. Each of the plates 6 and 7 is provided with a series of bayonet slots 10 and 11. The slots open at the peripheries of the plates and as seen in Fig. 4, the series of slots in one plate are arranged in reverse position with regard to the series of slots in the other plate. Thus in Fig. 4 at the left, the two series of bayonet slots are shown with their edge notches registering so that the link 5 may be entered into the notch. Then when the plates 6 and 7 are rotated in opposite directions, the links 5 are locked in the bayonet slots in the position at the right of Fig. 4.

The two plates 6 and 7 after the links 5 have been locked therein, are locked against rotation by means of a depression or seat 12 in the face of one disk and a head or boss 13 in the face of the other disk. The boss is designed of course to snap into the socket or depression 12 and when it does so, the parts are locked against relative movement.

If it becomes necessary to unlock the two plates, a tool may be driven into one or the other of a pair of overlapping holes 14 and 15 in the plates as indicated in Fig. 4. These holes 14 and 15 are arranged in their respective plates so that they will overlap when the locking parts 12 and 13 are in engagement, and it will be apparent that when a tool of wedge shape or a tapered tool is driven into the registering holes in Fig. 4, the plates will be moved to disconnect the locking parts 12 and 13. In this manner, should the cross chains 3 become worn or should it be desirable to replace a worn tread plate, the latter may be removed and a fresh one put in its place.

Having thus fully described my invention, what I claim as new and desire to secure by Letters Patent is—

In a tire chain the combination with a pair of flat plates having a central rivet and relatively rotatable on the rivet, said plates having a boss and complementary recess on adjoining faces, and said plates having a pair of overlapping holes for the purpose described, of a series of tongues formed at the edges of the plates, said tongues being fashioned by oppositely extending bayonet slots in the two plates, and a link retained by each pair of complementary tongues.

In testimony whereof I affix my signature.

FREIDRECK W. KERKMAN.